Sept. 27, 1938.　　　A. WEILAND　　　2,131,544

ROTARY SEAL

Filed March 13, 1936

INVENTOR
*A. Weiland*
BY
ATTORNEY

Patented Sept. 27, 1938

2,131,544

UNITED STATES PATENT OFFICE 2,131,544

ROTARY SEAL

Alfred Weiland, Philadelphia, Pa., assignor to Baldwin-Southwark Corporation, a corporation of Delaware Application March 13, 1936, Serial No. 68,575

9 Claims. (Cl. 286—7)

This invention relates to an improved seal between relatively rotatable members such as a stationary compressor casing and a rotatable compressor driving shaft actuated by an electric motor located externally of the compressor.

A great many attempts have heretofore been made to provide efficient sealed joints for the above and other types of apparatus, especially for refrigeration systems of small capacity, wherein it is vital to prevent leakage of refrigerant from the system on account of the relatively small volume of refrigerant contained therein. Such small capacity refrigerating systems are usually employed for household refrigerators and air conditioning apparatus for rooms and offices or other relatively small enclosures. These systems must be capable of operating without attention, and hence it is of the utmost importance to avoid leakage therefrom.

While satisfactory seals have been provided for relatively low speed small capacity compressors, yet such seals have been unsatisfactory when operated at higher speeds such as 1,200 to 1,800 R. P. M.

It is an object of my invention to provide an improved seal that is effective at high speeds. A further object is to provide an improved seal that will be very effective at such speeds in maintaining a uniform contact between relatively movable metallic sealing surfaces even though the rotatable shaft may be subject to "whipping" or other deflections or distortions.

A further object is to provide such an improved type of seal that is relatively simple, economical in construction and maintenance and efficient, reliable and durable in operation.

Other objects and advantages will be more apparent to those skilled in the art from the following description of the accompanying drawing in which.

Figure 1:
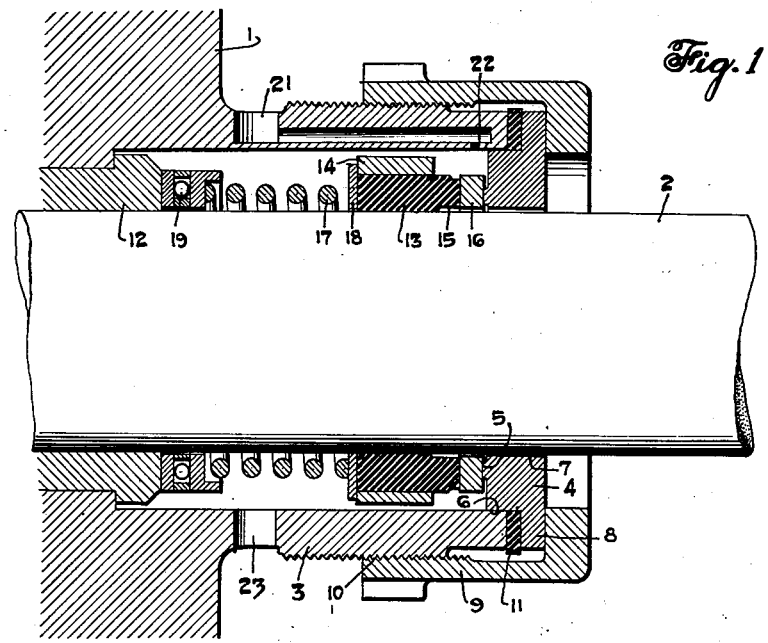
Fig. 1 is a longitudinal section through my improved seal showing its relation to a rotatable shaft and stationary casing.

In the particular embodiments of the invention which are disclosed herein merely for the purpose of illustrating certain specific forms among possible others that the invention might take in practice, I have diagrammatically shown a stationary casing or member 1 and a rotatable shaft 2. These members may respectively constitute a compressor casing and compressor driving shaft operated by a suitable externally located motor, or they may be parts of other suitable equipment wherein it is desired to effectively prevent leakage between the same. Hence for purposes of this disclosure it will suffice to describe only my improved seal which includes a suitable annular housing member 3 preferably formed integral with casing 1 and disposed concentrically of shaft 2 in spaced relation thereto. A sealing member 4, having a slightly raised flat annular sealing surface 5, is provided with a cylindrical guiding surface 6 for telescopic engagement with the inner periphery of annular member 3 while an opening 7 through which shaft 2 extends is slightly spaced therefrom. This sealing member 4 is provided with a flange 8 clamped against the outer end of housing 3 by a flanged sleeve 9 which preferably has threaded engagement 10 with the housing. A suitable compressible annular packing ring 11 may be interposed between flange 8 and housing 3, this packing ring being of such character that it provides a fixed leakproof joint.

A rotatable portion of the sealing means adapted for cooperation with sealing surface 5 is interposed between the fixed sealing surface 5 and a suitable stationary member 12. This member may be secured to or formed as a part of casing 1 as by constituting a bearing for shaft 2. The rotatable sealing means includes a resilient annular member 13 preferably formed of rubber and firmly slidably supported on the shaft to provide a fixed leakproof joint therewith, particularly when aided by a metallic band 14. This band is preferably immovably secured to the outer surface of the rubber annulus 13 as by vulcanization. The outer end of the rubber member is provided on its inner and outer sides with a distinct reduced neck portion 15 to which an annular metallic sealing ring 16 is vulcanized. This metallic ring engages the stationary sealing surface or seat 5 and is slightly spaced from shaft 2, although the major length of the inner periphery of rubber member 13 has a firm, substantially immovable, sealed contact with the periphery of shaft 2.

To maintain a uniform pressure on the relatively movable sealing surfaces of members 4 and 16, one end of a coil spring 17 bears against an annular plate 18, which is secured to or against members 13 and 14, while the other end of the spring is supported upon a bearing 19. This bearing is preferably of the ball bearing type resting against shaft bearing 12 or any other suitable abutment. It will of course be understood that any other suitable type of bearing may be employed for spring 17 to permit rotation of the internal rotatable sealing means (13—19) without imposing undue distortional effects upon the member 13.

In operation, rotation of shaft 2 will carry with it the rotatable sealing unit 13—19 while the seat 5 remains stationary with casing 1. The reduced neck portion 15 will permit appreciable distortion in shaft 2 without influencing the sealing ring 16. Thus the sealing member 16 maintains a continuous uniform sealing contact with seat 5 notwithstanding distortional effects transmitted to the main body of rubber member 13 from shaft 2 or from other causes, thereby insuring a very efficient and durable seal. It is seen that the rotatable sealing member 16 has no metallic contact with either band 14 or shaft 2 or with any other metallic member, and yet due to its vulcanized or otherwise permanently secured connection with member 13 as through the reduced neck 15 it is possible to provide an economical sealing arrangement.

It is preferable that the sealing surfaces between the members 4 and 16 should be continuously sprayed with oil, and to this end I have provided an oil inlet passage 21 communicating through a port 22 with the interior of housing 3 at a point adjacent the sealing members while an outlet 23 returns the oil to its source.

Figure 2:
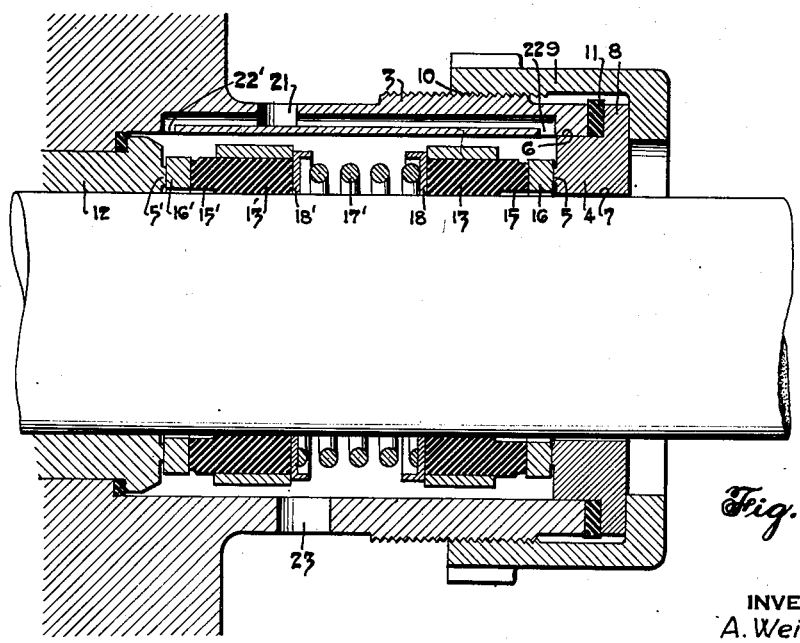
Fig. 2 is a modification showing the manner in which my improved seal may provide double sealing surfaces.

In the modification of Fig. 2, the inner end of a spring 17' is supported against an inner seal of identical construction to that comprising members 13—18. This inner seal includes a collar 18', a rubber annulus 13' having a snug fit with a shaft and provided with a reduced neck portion 15'. A metallic annular sealing member 16' is preferably vulcanized to the radial end surface of reduced portion 15' whereby the sealing member 16' and reduced portion 15' are freely radially flexible while maintaining a complete hermetic seal at all times. The annular sealing member 16' rotatably engages a seating surface 5' which is formed on part of the bearing 12. Hence it is seen that the construction and function of this inner seal are identical in every respect with the outer seal.

From the foregoing disclosures it is seen that I have provided a sealing device having a highly flexibly supported rotatable metallic sealing member which is connected by a hermetic joint with its flexible supporting base such as the reduced portion 15 while the main body 13 thereof is held in firm sealing contact with shaft 2 not only by reason of an original close fit therewith but also by the action of spring 17 in compressing the rubber body 13 whose radial expansion is prevented by hand 14.

It will of course be understood that various changes in details of construction and arrangement of parts may be made by those skilled in the art without departing from the spirit of the invention as set forth in the appended claims.

I claim:

1. A seal for relatively rotatable parts comprising, in combination, a pair of cooperating relatively movable metallic sealing members, a rubber annulus vulcanized to one of said sealing members, said vulcanized sealing member and the portion of said annulus adjacent thereto each being spaced from said parts to allow flexible movement of the vulcanized sealing member, and means acting on said annulus for urging its sealing member into contact with said other sealing member.

2. A seal for relatively rotatable parts comprising, in combination, a pair of relatively rotatable metallic members having cooperating annular sealing surfaces, one of said members being supported by and sealed with one of said parts, a resilient body element supporting the second one of said sealing members through a permanent hermetically sealed connection therewith and adapted to have sealed connection with the second one of said parts, said second sealing member and the portion of said resilient body element adjacent thereto being disposed in spaced relation to said second part, whereby said second sealing member may have substantially free flexible movement, and means acting upon said resilient body element for maintaining sealing pressure between said sealing surfaces.

3. The combination set forth in claim 2 further characterized by the provision of a metallic band encircling said resilient body element whereby the latter is forced radially inwardly into intimate contact with the part having sealing engagement therewith.

4. A seal for relatively rotatable parts comprising, in combination, a pair of metallic members having cooperating annular sealing surfaces, a rubber annulus having a radially unsupported reduced portion at one end and to which one of said sealing members is vulcanized, and means for supporting said rubber annulus upon one of said parts in sealing contact therewith.

5. A seal for a stationary casing and a rotatable shaft extending therethrough comprising, in combination, an annular stationary housing projecting from said casing in concentric but spaced relation to said shaft, a member supported adjacent the end of said housing and provided with a stationary annular sealing surface, a resilient annular body element supported on said shaft in sealing contact therewith and provided with an annular end supporting surface, a rotatable sealing member having an annular sealing surface for cooperation with said stationary surface and encircling said shaft in spaced relation thereto, said rotatable sealing member having a peripheral surface and an annular supporting surface extending entirely to said peripheral surface, and means whereby said annular supporting surface of said rotatable sealing member is supported entirely by said annular end supporting surface of the resilient body element so as to permit relatively free radial and axial flexibility between said rotatable sealing member and said housing and shaft.

6. The combination set forth in claim 5 further characterized in that said body element adjacent its annular sealing member is of reduced thickness both at its inner and outer periphery.

7. A seal for a stationary casing and a rotatable shaft extending therethrough comprising, in combination, an annular stationary housing projecting from said casing in concentric but spaced relation to said shaft, a member supported adjacent the end of said housing and provided with a stationary annular sealing surface, a resilient annular body element supported on said shaft in sealing contact therewith, a rotatable sealing member having an annular sealing surface for cooperation with said stationary surface and encircling said shaft in spaced relation thereto, means whereby said rotatable sealing member is supported by the end of said body element so as to permit relatively free radial and axial flexibility therebetween, said body element adjacent its annular sealing member being of reduced thickness both at its inner and outer periphery, and a metallic band encircling said body element at a point spaced axially of said reduced thickness whereby the reduced body portion remains freely radially flexible.

8. A seal for a stationary casing and a rotatable shaft extending therethrough comprising, in combination, an annular stationary housing projecting from said casing in concentric but spaced relation to said shaft, a member supported adjacent the end of said housing and provided with a stationary annular sealing surface, a resilient annular body element supported on said shaft in sealing contact therewith, a rotatable sealing member having an annular sealing surface for cooperation with said stationary surface and encircling said shaft in spaced relation thereto, means whereby said rotatable sealing member is supported by the end of said body element so as to permit relatively free radial and axial flexibility therebetween, said body element adjacent its annular sealing member being of reduced thickness both at its inner and outer periphery, a metallic band encircling said body element at a point spaced axially of said reduced thickness whereby the reduced body portion remains freely radially flexible, and a spring interposed between a stationary portion of said casing and the resilient body element.

9. A seal for a stationary casing and a rotatable shaft extending therethrough comprising, in combination, an annular stationary housing projecting from said casing in concentric but spaced relation to said shaft, a member supported adjacent the end of said housing and provided with a stationary annular sealing surface, a resilient annular body element supported on said shaft in sealing contact therewith and provided with an end portion having an enlarged annular recess so that said end portion is in spaced relation to said shaft, a rotatable sealing member having an annular sealing surface for cooperation with said stationary surface and encircling said shaft in spaced relation thereto, and means for supporting said rotatable sealing member by said recessed end portion of said resilient annular body while an axial portion of said resilient body adjacent to said recessed portion thereof is entirely exposed around its periphery thereby allowing relatively free radial and axial flexibility of said rotatable sealing member.

ALFRED WEILAND.